United States Patent [19]

Chung

[11] Patent Number: 4,808,330

[45] Date of Patent: Feb. 28, 1989

[54] NON-TOXIC DETERGENT FOR CLEANING FRUIT AND VEGETABLES

[76] Inventor: C. S. Chung, No. 60 Ming-Shen East Road, Taipei, Taiwan

[21] Appl. No.: 186,142

[22] Filed: Apr. 26, 1988

[51] Int. Cl.$^4$ .................. A23B 7/156; A23B 7/16; C11D 7/26; C11D 7/50

[52] U.S. Cl. ........................... 252/170; 134/42; 252/89.1; 252/106; 252/173; 252/DIG. 14; 426/268; 426/286; 426/310; 426/321; 426/335; 426/532; 426/654

[58] Field of Search .............. 134/42; 252/89.1, 106, 252/170, 173, DIG. 14; 426/268, 286, 310, 321, 335, 532, 654

[56] References Cited

U.S. PATENT DOCUMENTS

| | | | |
|---|---|---|---|
| 3,872,020 | 3/1975 | Yamagishi | 252/142 |
| 3,958,021 | 5/1976 | Cook | 426/268 |
| 3,997,674 | 12/1976 | Ukai | 426/90 |
| 4,011,348 | 3/1977 | Farrier | 426/268 |
| 4,140,649 | 2/1979 | Bossert | 252/105 |
| 4,177,294 | 12/1979 | Lehmann | 426/271 |
| 4,244,975 | 1/1981 | Herbst | 426/271 |
| 4,649,057 | 3/1987 | Thomson | 426/532 |

FOREIGN PATENT DOCUMENTS

| | | | |
|---|---|---|---|
| 107193 | 4/1939 | Australia | 426/310 |
| 220968 | 11/1957 | Australia | 426/310 |
| 551714 | 3/1943 | United Kingdom | 426/310 |

*Primary Examiner*—Dennis Albrecht
*Attorney, Agent, or Firm*—Cushman, Darby & Cushman

[57] ABSTRACT

A detergent composition harmless to human body and animals. More particularly, the present invention discloses a detergent composition comprising form 15 to 30 weight percent of sodium chloride, form 10 to 35 weight percent of organic alcohol, from 8 to 25 weight percent of coconut oil and the balance essentially water. The detergent composition of the present invention is effective in removing pollutants such as residual toxicity, bacteria and fungi from the surface of foods such as vegetables and fruit. The detergent composition of the present invention is also effective in inhibiting the growth of bacteria and fungi.

3 Claims, No Drawings

NON-TOXIC DETERGENT FOR CLEANING FRUIT AND VEGETABLES

TECHNICAL FIELD AND BACKGROUND ART

The present invention relates to a detergent composition harmless to human body and animals. More particularly, this invention in its broadest context encompasses detergent compositions comprising sodium chloride, organic alcohol, coconut oil and water.

Pesticides are broadly used in the cultivation of vegetables and fruit to prevent these crops from being damaged by pests, blights or other plant diseases. Most pesticides are hazardous to human body and animals and as a consequence these crops can be harvested only after a safety period during which the toxicity of the pesticides decreases to a level meeting the safety requirement set up by the public health authorities. However, due to carelessness in the operation of harvesting the plants or applying the pesticides, very frequently residual toxicities are nevertheless found on the surface of the vegetables or fruit sold on the market. It is therefore still necessary to clean vegetables or fruits to remove residual toxicity before ingesting.

In the transportation of foods, bacteria and fungi unavoidably adhere to and more seriously propagate on the surface of the foods. Such bacteria and fungi will adversely affect the health of human body or animals and therefore should also be removed from the surface of foods before ingesting.

It has long been practiced to wash foods such as vegetables and fruit with water or saline solution to remove said residual toxicity, bacteria and fungi but the results have always been unsatisfactory.

Commercially available detergents for cleaning dishes consisting mainly of petrochemical surfactants such as alkyl-benzene sulfonate surfactant can also effectively remove pollutants such as residual toxicities, bacteria and fungi from the surface of foods. However, such detergents tend to adhere to the surface of foods and are not easily removed with water. Furthermore, such detergents per se will cause health problem if they enter human or animal bodies and result in a secondary pollution which refrains them from being used as a suitable detergent for cleaning foods.

It has been attempted to use detergent compositions consisting of coconut oil alcohol and coconut oil aliphatic acid derivatives in cleaning foods. Such detergent compositions do have a lower toxicity than petrochemical detergent compositions and are harmless to human skin. However, it has been found that such detergents will still notably affect the health of human body or animal adversely if eaten and thus is not suitable for use in cleaning foods.

SUMMARY OF THE INVENTION

It is an object of the present invention to provide a detergent composition capable of effectively removing pollutants such as residual toxicity, bacteria and fungi from the surface of foods such as vegetables and fruit.

It is a further object of the present invention to provide a detergent composition having the above efficacy while being harmless to human body or animals.

The present invention discloses a non-toxic detergent composition comprising:

(1) from 15 to 30 weight percent of sodium chloride;
(2) from 10 to 35 weight percent of an organic alcohol;
(3) from 8 to 25 weight percent of coconut oil; and
(4) the balance essentially water.

The non-toxic detergent composition of the present invention is capable of effectively removing pollutants such as residual toxicities, bacteria and fungi from the surface of foods such as vegetables and fruit.

DETAILED DESCRIPTION OF THE INVENTION

While this specification concludes with claims particularly pointing out and distinctly claiming that which is considered to be the invention, it is believed that the invention can be better understood from a reading of the following detailed description of the invention and the appended examples.

The detergent composition of the present invention comprises three essential components, namely sodium chloride, organic alcohol and coconut oil. The individual components are described in detail below.

Sodium Chloride

Sodium chloride is used in the detergent composition of the present invention as a buffering medium for stabilizing coconut oil and organic alcohol. Sodium chloride also serves as an ionization agent to further enhance the sterilizing and cleaning efficacy of the detergent composition of the present invention. Sodium chloride used in the detergent composition of the present invention may be in the form of any natural edible salt. Special purification steps are not needed to produce the sodium chloride for use in the present invention as along as there is no toxic substance present in the raw material.

The detergent composition of the present invention comprises from 15 to 30, preferably from 20 to 30, most preferably from 20 to 25 weight percent of sodium chloride.

Organic Alcohol

Organic alcohol is known to have sterilizing efficacy. It is used in the detergent composition of the present invention to inhibit the decay of other components. It also functions as a medium for completely mixing coconut oil and aqueous solution of sodium chloride which are not readily miscible without the help of an organic alcohol.

The organic alcohol used in the detergent composition of the present invention may be any non-toxic organic alcohol. Alcohols produced from natural foods such as fruit or starch are preferred due to safety consideration, ethanol being the most preferred.

The detergent composition of the present invention comprises from 10 to 35, preferably from 15 to 30, most preferably from 20 to 30 weight percent of organic alcohol.

Coconut Oil

Coconut oil is used in the detergent composition of the present invention to provide the major cleaning effect. Coconut oil is emulsified in water with the aid of sodium chloride and organic alcohol to give an emulsion. The emulsion is effective in stripping pollutants from the surface of foods such that the pollutants may be readily removed with water.

Coconut oil is a naturally occurring mixture having a range of compositions. Coconut oil contains primarily fatty acids having from 12 to 18 carbon atoms, although fatty acids having fewer or more carbon atoms are also present. Commercially available coconut oils contains on the average from about 65 to about 82 weight percent of fatty acids containing 12 to 18 carbon atoms with fatty acids containing 12 carbon atoms being the majority (about 48 weight percent) and about 98 weight percent of the total fatty acid content being present as saturated fatty acids. Industrially synthesized coconut oils are also suitable but are not preferred for use in the present invention as being slightly toxic to human body and animals.

The detergent composition of the present invention comprises from 8 to 25, preferably from 8 to 20, most preferably from 10 to 15 weight percent of coconut oil.

Optional Components

The detergent composition of the present invention may contain additional materials commonly found in detergents for food which meet the safety requirements. For example, the detergent composition of the instant invention may contain coloring agents, perfumes, thickners and enzyme. It is essential to the safe utilization of the instant composition that such additional materials must be nontoxic, edible and readily soluble in the detergent composition of the present invention.

The various components of the detergent composition of the present invention as indicated above have widely been acceptable as foods or food additives and thus ensure that the detergent composition of the present invention is safe even it enters the gastrointestinal track of human body or animals.

Usage

The detergent composition of this invention is particularly suitable for removing pollutants such as residual toxicities, bacteria and fungi from the surface of foods such as vegetables and fruit. The detergent composition of the subject invention is also effective in inhibiting the growth of bacteria and fungi. It is not contemplated that the detergent composition of the present invention can be used to clean greasy or heavily contaminated articles such as used dishes. The instant composition may be used in a form varying from being undiluted to being diluted about 100 times with water. It has been found the instant composition still has sufficient cleaning efficacy when diluted 100 times with water. When used for washing foods with smooth surface such as apples and cucumbers, the detergent composition of the present invention may be used undiluted followed by rinsing with water. Since the detergent composition is easily removed carrying pollutants by rinsing water, no detectable residual detergent will be found even with a small amount of rinsing water. Even if some level of residual detergent inadvertently enters human body or animals, there will still not be any health problem since all the components of the detergent composition of the subject invention are edible.

Preparation

The detergent composition of the present invention is prepared by mixing the above-mentioned components, while the preferred operation is as follows:

Dissolve sodium chloride in water in a desired proportion to give a first solution. Dissolve coconut oil in organic alcohol in a desired proportion to give a second solution. Mix the first and the second solutions in a desired proportion to give the detergent composition of the present invention.

The following examples are offered to aid in understanding of the present invention and are not to be construed as limiting the scope thereof. Unless otherwise indicated, all parts and percentages are by weight.

EXAMPLE I

Dilute Mevinphos (a pesticide containing 25% of 2-methoxycarboxy-1-methylvinyldimethyl-phosphate, available form Sin-Chi Corporation or Hsin-Non Corporation, Taiwan, Republic of China) 1000 times with water as instructed by the label on the package and spray the resulting solution on the surface of a bunch of grapes of similar sizes. A portion of the sprayed grapes was randomly selected as the calibration sample containing 100% residual toxicity. The remaining sprayed grapes were exposed outdoors for 24 hours and a portion of the exposed grapes was randomly selected as the first set of samples. Another portion of the exposed grapes was randomly selected and washed with water to give the second set of samples.

20 grams of sodium chloride was mixed with 40 grams of water to give a first solution and 30 grams of ethanol was mixed with 10 grams of coconut oil to give a second solution. The first and the second solutions were then mixed thoroughly to give the detergent composition of the present invention. The resulting detergent composition was then diluted 100 times with water to give a diluted detergent composition. Another portion of the exposed grapes described in the immediately preceding paragraph was randomly selected and washed with the diluted detergent composition to give the third set of samples.

Said washing operations with water and diluted detergent composition adopt the same procedure, i.e. putting one grape into 100 ml of water or diluted detergent composition, stirring the water or diluted detergent composition 30 cycles with a stick, and taking out the washed grape.

Determine the residual toxicity of the three set of samples by the biochemical detecting method developed by Taiwan Agricultural Testing Institute, Republic of China. The method comprises the following steps:

Add 20 $\mu$l of Acetylcholinesterase enzyme (5000 IU/l) to 10 ml of sodium phosphate buffer solution (pH about 7.5) with stirring. Put one grape of each set of sample into the resulting solution and stir the solution 20 cycles with a glass stick. Discard the grape. Let the solution stand under room temperature for 20 minutes. Add to the solution 1 mg of DTNB(Dithio-bis-2-nitrobenzoic acid) and 2 mg ATCI(Acetylthiocholine iodine) powders and stir the mixture 5 cycles with a glass stick to dissolve the powders. Put the resulting solution into a PERKIM-ELMER Model 35 spectrometer immediately after the DTNB and ATCI powders dissolve completely. Record the absorption value every 1 minute until the fifth minute passed. Repeat the above procedure for each of the three sets of samples.

The same procedures was repeated two more times except that in one test the grape is replaced by the 100% calibration sample (grape which was sprayed with Mevinphos but was not exposed outdoors and washed) to obtain experimental data as 100% residual toxicity calibration standard and in the other test no grape was added at all to obtain the experimental data as 0% residual toxicity calibration standard.

The interaction between Acetylcholinesterase enzyme and DTNB and ATCI powder will cause the testing solution to change color from transparence to deep yellow. It has been found that the absorption of the testing solution increases in a constant rate. It has also been found that if some degree of residual toxicity exists in the testing solution, the activity of Acetylcholinesterase enzyme will be inhibited and the rate of increase of absorption will be lowered by a degree proportional to the quantity of the quantity of the residual toxicity in the testing solution. The level of residual toxicity of the three sets of samples in the example can therefore be obtained by interpolating form rates of absorption increase of the 100% calibration standard and the 0% calibration standard. Thus the residual toxicity of the three sets of sample may be calculated with the following equation:

$$\text{Residual toxicity (\%)} = \frac{(R_0 - R_{sam})}{(R_0 - R_{100})} \times 100 \qquad (I)$$

wherein $R_0$ represents the rate of absorption increase of the 0% calibration standard.

$R_{100}$ represents the rate of absorption increase of the 100% calibration standard.

$R_{sam}$ represents the rate of absorption increase of the sample of which the residual toxicity is to be determined.

The absorption values of the first five minutes, the rates of absorption (A) calculated with graphic method and the residual toxicities (R) calculated from Equation (I) of the three sets of samples (Samples 1, 2 and 3) and two sets of calibration standard (0% Std. and 100% Std.) are listed in Table I.

TABLE I

|  | 1 min | 2 min | 3 in | 4 min | 5 min | A | R (%) |
| --- | --- | --- | --- | --- | --- | --- | --- |
| Sample 1 | 0.186 | 0.209 | 0.233 | 0.264 | 0.287 | 0.023 | 72 |
| Sample 2 | 0.237 | 0.271 | 0.316 | 0.344 | 0.380 | 0.035 | 57 |
| Sample 3 | 0.202 | 0.287 | 0.373 | 0.461 | 0.549 | 0.085 | 0 |
| 0% Std. | 0.141 | 0.228 | 0.312 | 0.395 | 0.477 | 0.083 | 0 |
| 100% Std. | 0.161 | 0.163 | 0.167 | 0.170 | 0.174 | 0.004 | 100 |

As shown in Table I, the grape that was exposed outdoors for 24 hours but was not washed (Sample 1) contains 72% residual toxicity and the grade that had been exposed and washed with water contains 57% residual toxicity. This shows that washing with water removed only 20.08% of the residual toxicity. On the contrary, the grape that was exposed and washed with the diluted detergent composition of the present invention (Sample 3) contains essentially no residual toxicity. It is evident from these data that the detergent composition removed essentially all the residual toxicity.

EXAMPLE II

The detergent composition of the present invention was prepared as in Example I and the composition was diluted 100 times with sterilized water. A bunch of grapes of similar sizes was purchased from the market. One grape was washed with the diluted detergent composition using the same procedure as in Example I. The washed grape and another unwashed grape were inoculated in two blood agar plates separately. The inoculums were incubated in 37° C. for 24 hours. The inoculums were observed with the following result:

TABLE II

| Unwashed grape | 4 colonies of bacteria were observed |
| --- | --- |

TABLE II-continued

| Washed grape | No colony of bacteria was observed |
| --- | --- |

Table II shows that the detergent composition removed the bacteria that dropped form the atmosphere and adhered to the surface the tested grape while the mere water did not. It is evident form these data that the detergent composition can effectively remove the bacteria on the surface of foods.

EXAMPLE III

The detergent composition of the present invention was prepared as in Example I and the composition was diluted 5,000, 10,000, 50,000, and 100,000 times with water respectively. The four resulting diluted detergent compositions were put into four beakers respectively and four mosquito fish of similar sizes (about 3–4 cm in body length) were put into these beakers, one for each beaker. The fish were observed for three days. Repeat the same procedure except that the the detergent composition was replace by Paos ® (a detergent composition available from Nice Corporation, Taiwan, Republic of China with the labeled main ingredient of coconut oil surfactants and coconut oil fatty acid derivatives) and Salatt ® (a detergent composition available for Tze-Li Corporation, Taiwan, Republic of China with the labeled main ingredient of straight chain alkyl benzene sulfonic acid surfactant). Additional four mosquito fish were put into four beaker containing water only, one for each beaker, as the control. The result is shown as follows:

TABLE III

| | Observations on mosquito fish for 3 days | | | |
| --- | --- | --- | --- | --- |
| Dilution ratio | 5,000 | 10,000 | 50,000 | 100,000 |
| Instant Invention | alive | alive | alive | alive |
| Paos ® | died 20th min. | died 90th min. | alive | alive |
| Salatt ® | died 15th min. | died 32th min | alive | alive |
| Control | alive | alive | alive | alive |

As shown in Table III, it is evident that the detergent composition of the present invention has the lowest effect on the life of the mosquito fish.

EXAMPLE IV

The detergent composition of the present invention was prepared as in Example I. The composition and the detergent composition with the trade name Paos ® were inoculate in two blood agar plates respectively. The inoculums were incubated in 37° C. for 24 hour. The inoculums were observed with the following result:

TABLE IV

| Paos ® | Numerous colonies of bacteria observed |
| --- | --- |
| The instant invention | No colony of bacteria observed |

It is evident form Table IV that the detergent composition of the present invention effectively inhibited the reproduction of bacteria.

EXAMPLE V

Most grapes are sold on the market with some white pollutant covering all the surface. Such white pollutant has been analyzed as containing mostly sugar which comes from the interior of grapes. The white pollutant is not easily washed off with water. This example use such grapes as the substrate to compare the cleaning efficacy of the detergent compositions within the range of the present invention with those outside the range.

Detergent composition of various relative ratios were prepared as in Example I. These detergent compositions were diluted 100 times with water and used to wash grapes of similar sizes which contain white pollutants on their surface in the manner as in Example I. The result was observed, graded with the following notations 3: the white pollutants were completely removed
2: the white pollutants were half removed
1: the white pollutants were not removed at all
and listed in Table 5.

TABLE V

| NaCl | Ethanol | unit: wt % Coconut oil | Result |
| --- | --- | --- | --- |
| 0 | 30 | 10 | 2 |
| 10 | 30 | 10 | 2.5 |
| 20 | 30 | 10 | 3 |
| 30 | 30 | 10 | 3 |
| 30 | 0 | 10 | 1 |
| 30 | 10 | 10 | 3 |
| 30 | 20 | 10 | 3 |
| 30 | 30 | 10 | 3 |

TABLE V-continued

| NaCl | Ethanol | unit: wt % Coconut oil | Result |
| --- | --- | --- | --- |
| 30 | 40 | 10 | 3 |
| 30 | 30 | 0 | 1 |
| 30 | 30 | 5 | 2 |
| 30 | 30 | 10 | 3 |
| 30 | 30 | 15 | 3 |
| 30 | 30 | 20 | 3 |
| 30 | 0 | 0 | 1 |
| 0 | 30 | 0 | 1 |
| 0 | 0 | 10 | 1 |

I claim:

1. A non-toxic detergent composition effective for removing pollutants such as residual toxicities, bacteria and fungi from food surface comprising:
   (1) from 15 to 30 weight percent of sodium chloride;
   (2) from 10 to 35 weight percent of ethanol;
   (3) from 8 to 25 weight percent of coconut oil; and
   (4) the balance essentially water.

2. The detergent composition as claimed in claim 1, wherein said detergent composition comprises from 20 to 30 weight percent of said sodium chloride, from 15 to 30 weight percent of said ethanol and from 8 to 20 weight percent of said coconut oil.

3. The detergent composition as claimed in claim 1, wherein said detergent composition comprises from 20 to 25 weight percent of said sodium chloride, from 20 to 30 weight percent of said ethanol and from 10 to 15 weight percent of said coconut oil.

* * * * *